US012166716B2

(12) United States Patent
Guo

(10) Patent No.: US 12,166,716 B2
(45) Date of Patent: Dec. 10, 2024

(54) METHOD AND APPARATUS FOR CONFIGURING PRS RESOURCES

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 511 days.

(21) Appl. No.: 17/451,677

(22) Filed: Oct. 21, 2021

(65) Prior Publication Data
US 2022/0038239 A1 Feb. 3, 2022

Related U.S. Application Data

(63) Continuation of application No. PCT/CN2020/105108, filed on Jul. 28, 2020.

(60) Provisional application No. 62/882,421, filed on Aug. 2, 2019.

(51) Int. Cl.
*H04L 5/00* (2006.01)
*H04W 64/00* (2009.01)
*H04W 72/0446* (2023.01)

(52) U.S. Cl.
CPC ........... *H04L 5/0051* (2013.01); *H04W 64/00* (2013.01); *H04W 72/0446* (2013.01)

(58) Field of Classification Search
CPC .......................... G01S 5/0036; H04L 27/261; H04L 27/26025
See application file for complete search history.

(56) References Cited

U.S. PATENT DOCUMENTS

| 2011/0081933 | A1* | 4/2011 | Suh ....................... H04W 64/00 455/509 |
| 2011/0230144 | A1* | 9/2011 | Siomina ................ H04L 5/0044 455/68 |
| 2013/0122930 | A1* | 5/2013 | Woo ....................... H04L 5/0073 455/456.1 |
| 2015/0365790 | A1* | 12/2015 | Edge ..................... H04W 76/50 455/456.1 |

(Continued)

FOREIGN PATENT DOCUMENTS

| CN | 103517314 A | 1/2014 |
| CN | 105429742 A | 3/2016 |

(Continued)

OTHER PUBLICATIONS

First Office Action of the European application No. 20849873.3, issued on Dec. 8, 2022. 4 pages.

(Continued)

*Primary Examiner* — Charles N Appiah
*Assistant Examiner* — Frank E Donado
(74) *Attorney, Agent, or Firm* — Perkins Coie LLP

(57) ABSTRACT

A method and apparatus for configuring PRS resources are provided. The method includes that UE receives configuration information for a PRS resource set from a network device. The configuration information includes a respective PRS muting configuration for each PRS resource in the PRS resource set, and different PRS muting configurations are configured for different PRS resources in the PRS resource set.

14 Claims, 5 Drawing Sheets

(56) References Cited

U.S. PATENT DOCUMENTS

| | | | |
|---|---|---|---|
| 2018/0054286 A1 | 2/2018 | Tang et al. | |
| 2018/0139763 A1 | 5/2018 | Bitra et al. | |
| 2018/0146332 A1 | 5/2018 | Opshaug et al. | |
| 2021/0297215 A1* | 9/2021 | Da | H04W 4/02 |
| 2022/0086601 A1* | 3/2022 | Qi | G01S 5/0236 |

FOREIGN PATENT DOCUMENTS

| | | | |
|---|---|---|---|
| WO | 2016164085 A1 | 10/2016 | |
| WO | 2018093835 A1 | 5/2018 | |
| WO | 2018097886 A1 | 5/2018 | |

OTHER PUBLICATIONS

First Office Action of the Chinese application No. 202111221657.7, issued on Jan. 19, 2023. 11 pages with English translation.

Catt "DL and UL Reference Signals for NR Positioning" R1-1905346; 3GPP TSG RAN WG1 #96bis; Xi' an, China, Apr. 8-12, 2019. 27 pages.

Ericsson "DL Reference Signals for NR Positioning" R1-1907508; 3GPP TSG RAN WG1 Meeting #97; Reno, NV, USA, May 13-17, 2019. 27 pages.

Intel Corporation "Outcome of offline discussion #2 on AI 7.2.10. 1-DL Reference Signals for NR Positioning" R1-1907895; 3GPP TSG RAN WG1 Meeting #97; Reno, USA, May 13-17, 2019. 16 pages.

Supplementary European Search Report of the European application No. 20849873.3, issued on Mar. 17, 2022. 9 pages.

Second Office Action of the Chinese application No. 202111221657.7, issued on Apr. 19, 2023. 10 pages with English translation.

3GPP TSG RAN WG1 #97 R1-1906054, Reno, USA, May 13-17, 2019, Agenda Item: 7.2.10.3, Source: Huawei, HiSilicon, Title: NR positioning measurements, Document for: Discussion and decision.

International Search Report in the international application No. PCT/CN2020/105108, mailed on Oct. 28, 2020.

Written Opinion of the International Search Authority in the international application No. PCT/CN2020/105108, mailed on Oct. 28, 2020.

\* cited by examiner

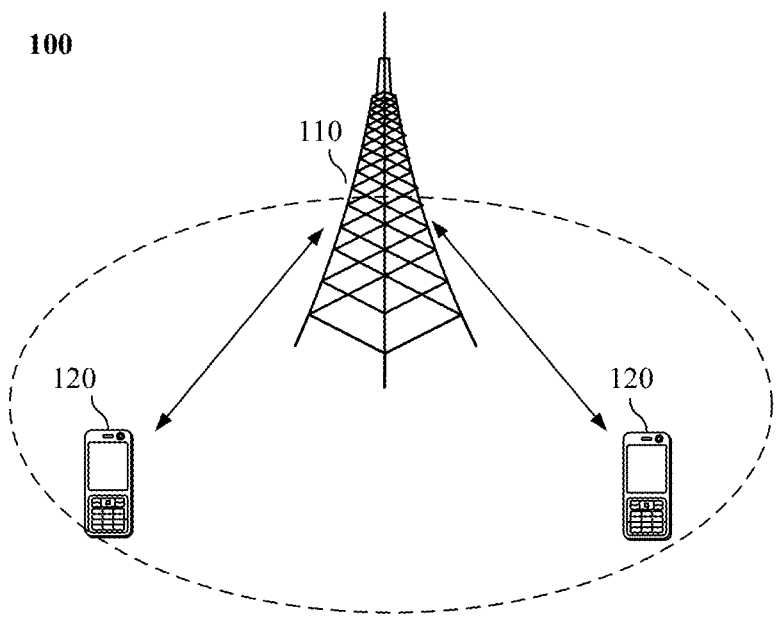

FIG. 1

A network device transmits first configuration information to a UE, and the UE receives the first configuration information from the network device, where the first configuration information includes configuration information about multiple PRS resource sets, the multiple PRS resource sets include a first PRS resource set and at least one second PRS resource set, the first PRS resource set is configured as a reference set for RSTD measurement, and the second PRS resource set is configured for RSTD measurement

METHOD AND APPARATUS FOR CONFIGURING PRS RESOURCES

CROSS-REFERENCE TO RELATED APPLICATIONS

This is a continuation application of International Patent Application No. PCT/CN2020/105108, filed on Jul. 28, 2020, which claims priority to U.S. Patent Application No. 62/882,421, filed on Aug. 2, 2019, the entire contents of which are incorporated herein by reference.

TECHNICAL FIELD

The disclosure relates to the technical field of mobile communications, and in particular to a method and apparatus for configuring PRS resources, a UE, and a network device.

BACKGROUND

When a Downlink-Time Difference Of Arrival (DL-TDOA) positioning method is adopted to locate User Equipment (UE), it needs to be achieved by measuring a Reference Signal Time Difference (RSTD).

In Long Term Evolution (LTE) system, RSTD measurement is based on Positioning Reference Signal (PRS). Specifically, the UE may determine an RSTD value by measuring the PRSs transmitted by two base stations. However, due to differences between the LTE system and an NR system, the methods for PRS in LTE system are not able to support the NR system.

SUMMARY

Embodiments of the disclosure provide a method and apparatus for configuring PRS resources.

In a first aspect, the embodiment of the disclosure provides a method for configuring PRS resources, which includes the following operation.

UE receives configuration information for a PRS resource set from a network device. The configuration information comprises a respective PRS muting configuration for each PRS resource in the PRS resource set, and different PRS muting configurations are configured for different PRS resources in the PRS resource set.

In a second aspect, the embodiment of the disclosure provides a method for configuring PRS resources, which includes the following operation.

A network device transmits configuration information for a PRS resource set to UE. The configuration information comprises a respective PRS muting configuration for each PRS resource in the PRS resource set, and different PRS muting configurations are configured for different PRS resources in the PRS resource set.

In a third aspect, the embodiment of the disclosure provides an apparatus for configuring PRS resources, which includes a transceiver, a processor, and a memory for storing a computer program.

The processor is configured to execute the computer program stored in the memory to control the transceiver to receive configuration information for a PRS resource set from a network device. The configuration information comprises a respective PRS muting configuration for each PRS resource in the PRS resource set, and different PRS muting configurations are configured for different PRS resources in the PRS resource set.

BRIEF DESCRIPTION OF THE DRAWINGS

The accompanying drawings are described here to provide a further understanding of the disclosure, and form a part of the disclosure. The embodiments of the disclosure and description thereof are used to explain the disclosure, and do not intended to limit the disclosure. In the drawings:

FIG. 1 is a diagram illustrating architecture of a communication system according to an embodiment of the disclosure.

FIG. 2 is a flowchart illustrating a method for configuring PRS resources according to an embodiment of the disclosure.

DETAILED DESCRIPTION

Figure 3:
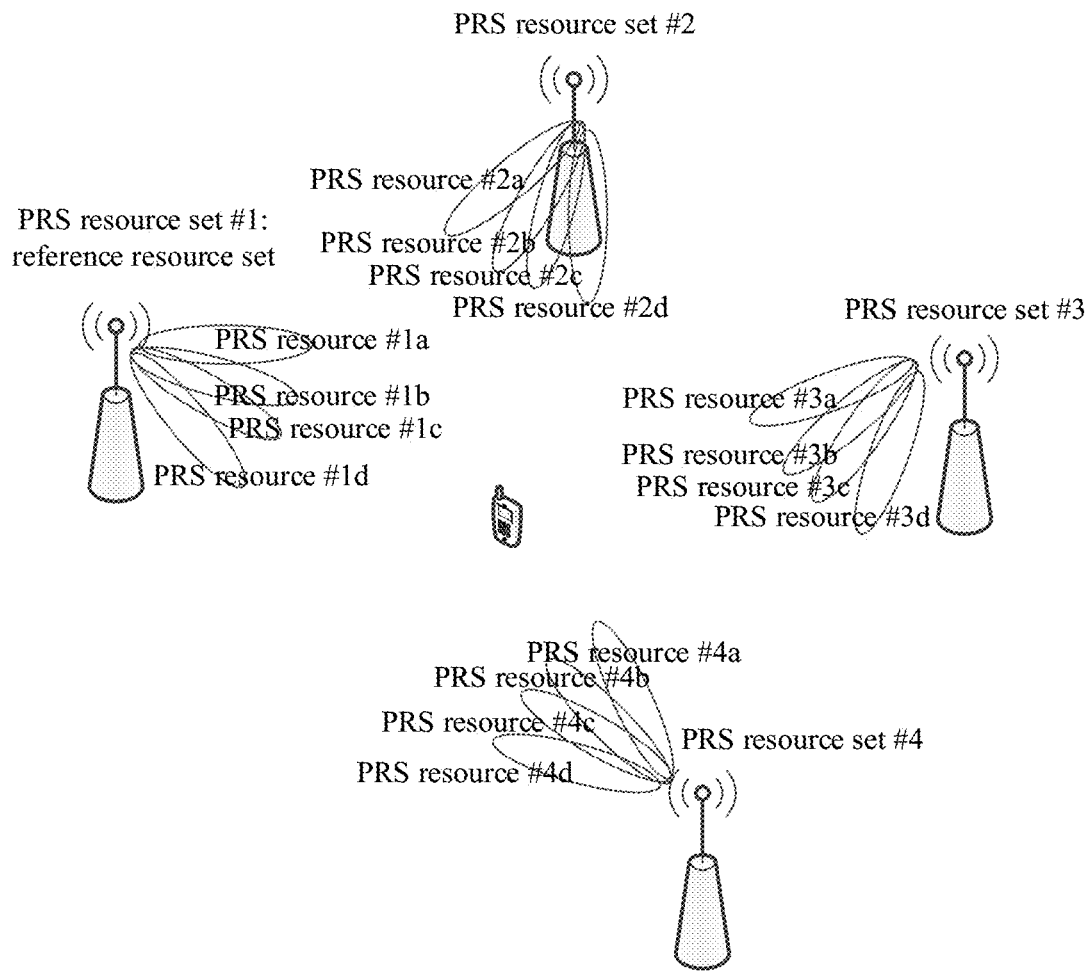
FIG. 3 is a diagram illustrating multiple PRS resources corresponding to multiple beams according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

The technical solutions in the embodiments of the disclosure may be applied to various communication systems, for example, a Long Term Evolution (LTE) system, a LTE Frequency Division Duplex (FDD) system, a LTE Time Division Duplex (TDD) system, a 5th Generation (5G) communication system or a future communication system.

FIG. 1 is a diagram of architecture of a communication system 100 to which the embodiments of the disclosure is applied. The communication system 100 may include a network device 110. The network device 110 may be a device that communicates with a terminal 120 (or called a communication terminal or terminal). The network device 110 may provide communication coverage for a specific geographic area, and may communicate with terminals within the coverage area. Optionally, the network device 110 may be an Evolutional Node B (eNB or eNodeB) in an LTE system or a wireless controller in a Cloud Radio Access Network (CRAN); or the network device may be a mobile switching center, a relay station, an access point, a vehicle-mounted device, a wearable device, a hub, a switch, a network bridge, a router, a network device in a 5G network, or a network device in a future communication system, etc.

The communication system 100 may also include at least one terminal 120 within the coverage area of the network device 110. The terminal used herein may include, but is not limited to, a device that is configured to receive/transmit communication signals via a wired connection (such as via a Public Switched Telephone Networks (PSTN), Digital Subscriber Line (DSL), digital cable, direct cable connection), and/or via another data connection/network, and/or via a wireless interface, for example, a cellular network, a Wireless Local Area Network (WLAN), a Digital TV network such as Digital Video Broadcasting Handheld (DVB-H) network, a satellite network, an Amplitude Modulation (AM)-Frequency Modulation (FM) broadcast transmitter and/or another communication terminal; and an Internet of Things (IoT) device. A terminal configured to communicate over a wireless interface may be called "a wireless communication terminal", "a wireless terminal" or "a mobile terminal". Examples of the mobile terminal may include, but are not limited to, a satellite or cellular phone; a personal communications system (PCS) terminal that can combine a cellular radio telephone with data processing, facsimile, and data communication capabilities; a Personal Digital Assistant (PDA) that can include a radiotelephone, a pager, an Internet/intranet access, a Web browser, a notebook, calendar and/or a Global Positioning System (GPS) receiver; and a conventional laptop and/or palmtop receiver, or other electronic devices including radiotelephone transceivers. The terminal may be an access terminal, User Equipment (UE), a user unit, a user station, a mobile station, a mobile platform, a remote station, a remote terminal, a mobile device, a user terminal, a terminal, a wireless communication device and a user proxy or user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-amounted device, a wearable device, a terminal in a 5G network, or a terminal in a future evolved Public Land Mobile Network (PLMN).

Optionally, a Device to Device (D2D) communication may be performed between the terminals 120.

Optionally, the 5G communication system or 5G network may also be called a New Radio (NR) system or NR network.

FIG. 1 exemplarily illustrates one network device and two terminals. Optionally, the communication system 100 may include multiple network devices and other numbers of terminals may be within the coverage of each network device. This is not limited in the embodiments of the present disclosure.

Optionally, the communication system 100 may further include other network entities such as a network controller, a mobility management entity and the like. This is not limited in the embodiments of the present disclosure.

It should be understood that in the embodiments of the present disclosure, the device having a communication function in the network/system may be called a communication device. Taking the communication system 100 illustrated in FIG. 1 as an example, the communication device may include a network device 110 and a terminal 120 having a communication function. The network device 110 and the terminal 120 may be the specific devices described above, and are not described herein again. The communication device may also include other devices in the communication system 100, such as other network entities such as a network controller and a mobile management entity, which are not limited in the embodiments of the present disclosure.

It should be understood that the terms "system" and "network" in the present disclosure are usually used interchangeably. The term "and/or" in the present disclosure is only an association relationship describing associated objects and represents that three relationships may exist. For example, A and/or B may represent three conditions: i.e., independent existence of A, existence of both A and B and independent existence of B. In addition, character "/" in the present disclosure usually represents that previous and next associated objects form an "or" relationship.

For better understanding of the technical solutions in the embodiments of the present disclosure, the technical solutions related to the embodiments of the present disclosure are described in more detail below.

In 3GPP LTE, Positioning Reference Signal (PRS) was introduced to support downlink time difference-based positioning technology. In LTE, PRS are transmitted in predefined positioning subframes grouped by several (for example, $N_{PRS}$) consecutive subframes, which are termed as "positioning occasion". Positioning occasions occur periodically with a certain periodicity. The period is defined in 3GPP TS 36.211 and can be 160, 230, 640 or 1280 subframes. The number of consecutive subframes may be 1, 2, 4 or 6 subframes.

PRS transmission from one cell can be configured through a PRS configuration index. One PRS configuration index value gives configurations of PRS periodicity and PRS subframe offset, which defines a starting subframe of PRS transmission relative to SFN=0. Examples of PRS configuration index are shown in the table below:

TABLE 1

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

In general, PRS instances in LTE, for the first subframe of the $N_{PRS}$ subframes, shall satisfy $$\left(10 \times n_f + \left\lfloor \frac{n_s}{2} \right\rfloor - \Delta_{PRS}\right)$$

Mod $T_{PRS}=0$, where $n_f$ is a system frame number, $n_s$ is a slot number within a radio frame, $T_{PRS}$ and $\Delta_{PRS}$ are the periodicity and subframe offset of PRS, respectively.

PRS muting configuration of a cell is defined by a periodic PRS muting sequence with periodicity $T_{REP}$, where $T_{REP}$ counted in number of PRS positioning occasion can be 2, 4, 8 or 16. PRS muting information is represented by a bit string of length 2, 4, 8 or 16 bits. Each bit in that bit string can have value 0 or 1. If a bit in the PRS muting information is set to 0, then the PRS is muted in the corresponding PRS positioning occasion. The first bit of the PRS muting sequence corresponds to a first PRS positioning occasion that starts after the beginning of a assistance data reference cell SFN=0. In LTE, a 16-bit muting pattern cannot be used together with a periodicity 1280 ms, because the range of muting pattern would then extend over 20.48 seconds which is twice as big as a roll-over value of the SFN value.

In order to exploit a high detection capability of the PRS, the network needs to be synchronized to LTE frame boundaries and the PRS occasions for all cells need to be aligned in time.

The methods of PRS in LTE are not able to support following characteristics of the NR system.

The NR system in FR2 is multi-beam system and supports beam sweeping. The methods of PRS in LTE cannot support multi-beam operation.

The NR system supports flexible numerology, but the methods of PRS in LTE do not support that. They only support 15 KHz subcarrier spacing.

The muting of PRS in LTE is applied to all PRSs sent from one cell. In the NR system, however, multiple PRSs would be transmitted for multi-beam operation. The muting shall be per Tx beam direction, i.e., per PRS resource. The muting in NR shall also consider flexible allocation bandwidth and different numerologies used by neighbor cells.

To this end, the following technical solutions in the embodiments of the present disclosure are provided in detail below.

It should be noted that in the examples or embodiments of present disclosure, the term "downlink PRS" may also be referred to as "PRS" for short. "DL-TDOA" may also be referred to as "TDOA" for short.

It should be noted that in the examples or embodiments of present disclosure, the terms "TDOA measurement" and "RSTD measurement" may be used interchangeably.

FIG. 2 is a flowchart illustrating a method for configuring PRS resources according to an embodiment of the disclosure. As shown in FIG. 2, the method for configuring PRS resources includes the following operations.

At block 201, a network device transmits first configuration information to a UE, and the UE receives the first configuration information from the network device. The first configuration information includes configuration information about multiple PRS resource sets. The multiple PRS resource sets include a first PRS resource set and at least one second PRS resource set. The first PRS resource set is configured as a reference set for RSTD measurement, and the second PRS resource set is configured for RSTD measurement.

With the above technical solutions, considering that the NR system supports multi-beam transmission and flexible numerology, the network side configures the first PRS resource set for the UE as a reference set for RSTD measurement, and further configures at least one second PRS resource set for RSTD measurement. The UE may select a first PRS resource as a reference resource in the first PRS resource set, and select a second PRS resource in the second PRS resource set for measuring RSTD with reference to the first PRS resource, thereby implementing positioning in the NR system.

In the embodiment of the disclosure, the network device may refer to a server. In one example, the network device is a location server.

In the embodiment of the disclosure, the first configuration information includes configuration information about multiple PRS resource sets. The multiple PRS resource sets include a first PRS resource set and at least one second PRS resource set. The first PRS resource set is configured as a reference set for RSTD measurement, and the second PRS resource set is configured for RSTD measurement. It should be noted that the second PRS resource set is configured for measuring RSTD with reference to a first PRS resource contained in the first PRS resource set.

In the embodiment of the disclosure, each PRS resource in the first PRS resource set is associated with a respective beam and each PRS resource in the second PRS resource set is associated with a respective beam.

In one embodiment, a UE can receive from, a location server, the configuration information about a Downlink (DL) PRS resource set (i.e., the first PRS resource set) which is configured as a reference set for DL-TDOA measurement and one or more DL PRS resource sets (i.e., the second PRS resource sets) which are configured for measuring DL-TDOA with reference to the PRS resource (i.e., the first PRS resource) contained in the reference PRS resource set.

In an alternative embodiment, in each of the configured PRS resource sets, there can be K≥1 PRS resources.

Configuration Information for the First PRS Resource Set

The UE can be configured with the first PRS resource set as the reference set for RSTD measurement. The configuration information for the first PRS resource set includes at least one of the following.

1-1. Configuration information of a first reference point, where the first reference point is a reference point for the first PRS resource set in the frequency domain.

Here, the first reference point may also be called Point A. The configuration information of Point A is used to indicate an absolute frequency position of a reference resource block. The absolute frequency position of the reference resource block is used to generate a frequency domain resource allocation for the PRS resources configured in the first PRS resource set.

1-2. Configuration Information of a First Numerology

Here, the first numerology refers to a numerology used by the first PRS resource set. The first numerology includes at least one of the following parameters: subcarrier spacing or a cyclic prefix.

1-3. Configuration Information of a First Synchronization Signal/Physical Broadcast Channel Block (SS/PBCH Block, SSB)

Here, the configuration information of the first SSB is used to determine the SS/PBCH. The Synchronization Signal (SS) includes a Primary Synchronization Signal (PSS) and/or a Secondary Synchronization Signal (SSS). The configuration of SS/PBCH is used to provide QCL (quasi co-location) resource to the PRS resources contained in the first PRS resource set.

In an alternative embodiment, the configuration information of the first SSB includes one or more of the following configuration parameters: SSB position in one burst, a periodicity of the SSB, the subcarrier spacing used by the SS/PBCH, and an absolute frequency location of the SSB transmission.

1-4. Configuration Information for Each PRS Resource in the First PRS Resource Set Here, the configuration information for each PRS resource includes at least one of: a frequency-domain allocation of the PRS resource, a time-domain allocation of the PRS resource within a slot, a transmission periodicity of the PRS resource, a slot offset of the PRS resource, a repetition factor of the PRS resource, a muting information for the PRS resource and a QCL resource information for the PRS resource. Detailed description is provided below.

For each PRS resource contained in the first PRS resource set, the UE shall be configured with one or more of the following parameters.

Frequency-domain allocation: an index of a starting Resource Block (RB) with respect to the Point A configured for the first PRS resource set and the number of RBs.

Time-domain allocation: an index of a starting Orthogonal Frequency Division Multiplexing (OFDM) symbol within one slot and the number of OFDM symbols occupied by the PRS resource.

Transmission periodicity in terms of slots and slot offset in terms of slot used to define a slot location for the transmission of the PRS resource.

A repetition factor $N_s$ (or it can be called aggregation level): it specifies the same PRS resource can be transmitted in $N_s$ consecutive slots within one periodicity.

A muting information configured to that PRS resource.

QCL resource

In an alternative embodiment, if the QCL resource is a SS/PBCH block, an index of the SS/PBCH block is provided here.

In another alternative embodiment, if the QCL resource is a Channel state information reference signal (CSI-RS) resource, the UE is provided with CSI-RS resource identifier (ID) and a cell ID where the provided CSI-RS resource is located.

Configuration Information for the Second PRS Resource Set

The UE can be configured with a second PRS resource set which shall be used by the UE to measure RSTD with respect to the PRS resource contained in the first PRS resource set. The configuration information for the second PRS resource set includes at least one of the following.

2-1. Configuration information of a second reference point, where the second reference point is a reference point for the second PRS resource set in the frequency domain.

Here, the second reference point may also be called Point A. The configuration information of Point A is used to indicate an absolute frequency position of a reference resource block. The absolute frequency position of the reference resource block is used to generate a frequency domain resource allocation for the PRS resources configured in the second PRS resource set.

In an alternative embodiment, if the second PRS resource set is in the same frequency band as the first PRS resource set, the information of point A can be configured through a RB offset value with respect to the point A configured in the first PRS resource set.

2-2. Configuration Information of a Second Numerology

Here, the second numerology refers to a numerology used by the second PRS resource set. The second numerology includes at least one of the following parameters: subcarrier spacing or a cyclic prefix.

2-3. Configuration Information of a Second SSB

Here, the configuration information of the second SSB is used to determine the SS/PBCH. The SS includes the PSS and/or the SSS. The configuration of SS/PBCH is used to provide QCL (quasi co-location) resource to the PRS resources contained in the second PRS resource set.

In an alternative embodiment, the configuration information of the second SSB includes one or more of the following configuration parameters: SSB position in one burst, a periodicity of the SSB, the subcarrier spacing used by the SS/PBCH, and an absolute frequency location of the SSB transmission.

2-4. Configuration Information for Each PRS Resource in the Second PRS Resource Set Here, the configuration information for each PRS resource includes at least one of: a frequency-domain allocation of the PRS resource, a time-domain allocation of the PRS resource within a slot, a transmission periodicity of the PRS resource, a slot offset of the PRS resource, a repetition factor of the PRS resource, a muting information for the PRS resource and a QCL resource information for the PRS resource. Detailed description is provided below.

For each PRS resource contained in the second PRS resource set, the UE shall be configured with one or more of the following parameters.

Frequency-domain allocation: an index of a starting RB with respect to the Point A configured for the second PRS resource set and the number of RBs.

Time-domain allocation: an index of a starting OFDM symbol within one slot and the number of OFDM symbols occupied by the PRS resource.

Transmission periodicity in terms of slots and slot offset in terms of slot used to define a slot location for the transmission of the PRS resource.

A repetition factor $N_s$ (or it can be called aggregation level): it specifies the same PRS resource can be transmitted in $N_s$ consecutive slots within one periodicity.

A muting information configured to that PRS resource.

QCL resource: an index of an SSB is provided here. The UE can derive the configuration of the SSB according to the SS/PBCH configuration provided for the second PRS resource set.

In the solutions, the muting information configured for each PRS resource includes at least one of: a first parameter, a second parameter, a third parameter, or a fourth parameter.

The first parameter is used to determine whether each transmission period in the time domain shall be muted.

The second parameter is used to determine whether each PRS repetition time slot in a transmission period shall be muted.

The third parameter is used to determine that a first part of the frequency domain allocation shall be muted.

The fourth parameter is used to determine that a second part of the time domain allocation shall be muted.

It should be noted that, the first parameter is the muting information at a PRS period level, the second parameter is the muting information at a PRS repetition level, the third parameter is the muting information at a frequency-domain bandwidth allocation level, and the fourth parameter is the muting information at a PRS symbol level.

In the embodiment, the UE is requested to measure RSTD over the first PRS resource set and the second PRS rescore set. The UE can be requested to report the RSTD measurement to the location server.

Specifically, the UE selects a first PRS resource from the first PRS resource set as a reference resource for RSTD measurement, and selects a second PRS resource from the second PRS resource set for RSTD measurement. The UE determines an RSTD value based on a PRS received in the first PRS resource and a PRS received in the second PRS resource, and reports the RSTD measurement result to the network device.

In an implementation, the first PRS resource is the PRS resource with a best signal quality in the first PRS resource set.

In an implementation, the second PRS resource is the PRS resource with a best signal quality in the second PRS resource set. Alternatively, the second PRS resource is the PRS resource, that is associated with the same beam as the first PRS resource, in the second PRS resource set.

In an implementation, the RSTD measurement result includes at least one of: an identifier of the first PRS resource, an identifier of the second PRS resource, and the RSTD value.

In an implementation, the UE may report one or more RSTD measurement results. Herein, the RSTD measurement result may also be called RSTD reporting element. Further, in an implementation, each RSTD reporting element includes the following information.

A PRS resource ID in the first PRS resource set, which is used by the UE as a reference resource to measure RSTD.

Quality of TOA (time of arrival) measurement from the reported reference resource.

RSTD measurement from the second PRS resource set: a PRS resource ID used to measure the reported RSTD in the second PRS resource set, an RSTD measurement, and quality of the reported RSTD measurement.

The implementation of the technical solutions in the embodiments of the present disclosure will be further described in detail with reference to the specific examples below.

First Example

FIG. 3 illustrates an example of PRS resource configuration according to an embodiment of the discourse. As shown in FIG. 3, a UE is configured with DL PRS transmission from 4 Transmission/reception points (TRPs). The UE is configured with PRS resource set #1 as a reference resource set for RSTD measurement. The corresponding TRP uses four Tx beams to transmit DL PRSs. Therefore, the UE is configured with four PRS resources in the configuration of PRS resource set #1. The UE is also configured to receive PRSs from another three TRPs. To support that, the UE is configured with another three PRS resource sets: PRS resource set #2, PRS resource set #3 and PRS resource set #4, each of which corresponds to one TRP. To support beam sweeping, each of those PRS resource sets contains 4 PRS resources. The UE can pick one from the PRS resources #1a, #1b, #1c and #1d in the reference resource set (i.e., the PRS resource set #1), for example the one with best signal quality as the reference PRS resource for RSTD measurement. Then from each PRS resource set, the UE can pick the 'best' PRS resource and calculate the RSTD with respect to the reference PRS resource picked from the reference resource set.

Second Example

Figure 4:
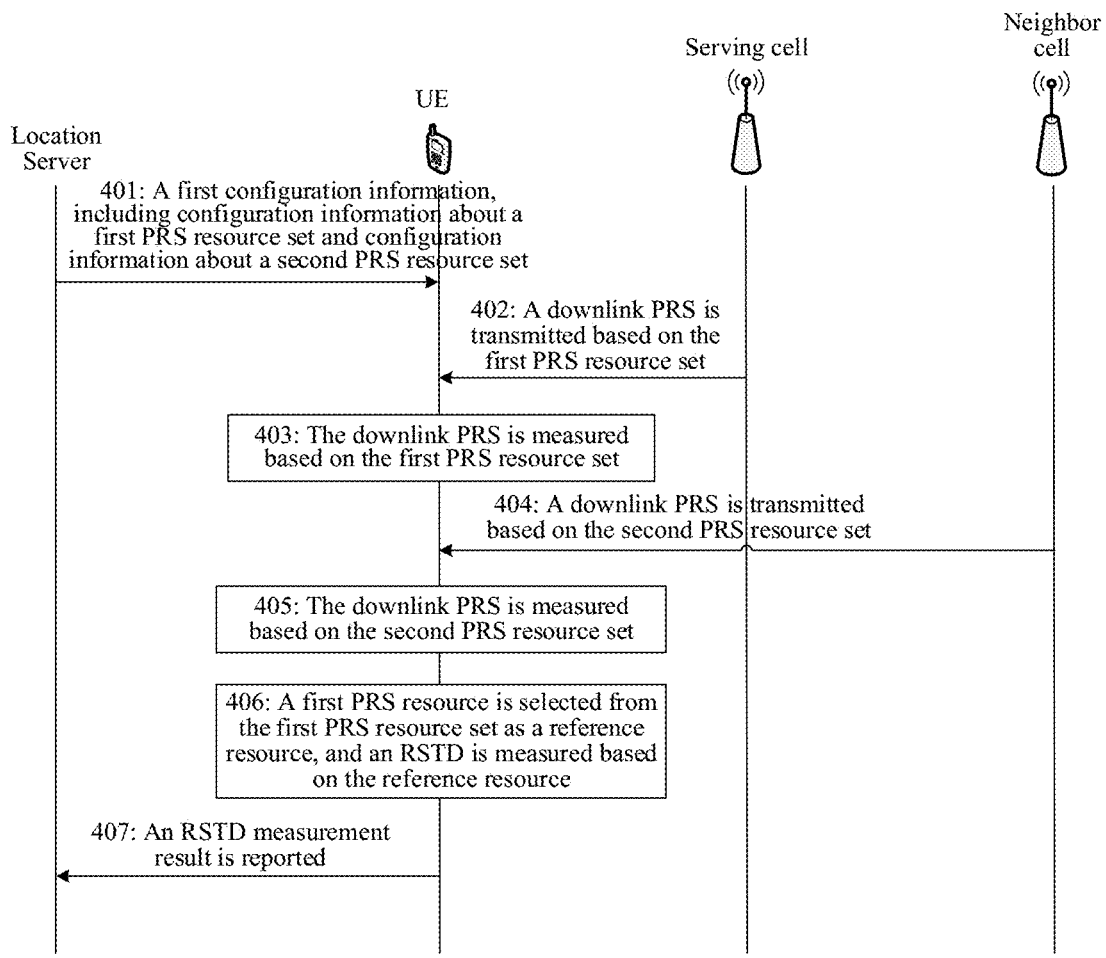
FIG. 4 is a flowchart illustrating a method for measuring RSTD according to an embodiment of the disclosure.

FIG. 4 illustrates a method for measuring RSTD according to an embodiment of the disclosure. As shown in FIG. 4, the method includes the following operations.

At 401, a location server sends first configuration information to a UE. The first configuration information includes configuration information about a first PRS resource set and configuration information about a second PRS resource set.

Herein, the first PRS resource set is configured as a reference set for RSTD measurement.

At 402, a serving cell transmits a downlink PRS based on the first PRS resource set.

At 403, the UE measures the downlink PRS based on the first PRS resource set.

At 404, a neighbor cell transmits a downlink PRS based on the second PRS resource set.

At 405, the UE measures the downlink PRS based on the second PRS resource set.

At 406, the UE selects a first PRS resource from the first PRS resource set as a reference resource, and measures RSTD based on the reference resource.

At 407, the UE reports an RSTD measurement result to the location server.

In the solution, the location server may first send configuration of PRS transmission to the UE. The PRS configuration may include the configuration of a first PRS resource set that is configured as a reference set for RSTD measurement and a second PRS resource set for RSTD measurement. The first PRS resource set corresponds to the serving cell. The serving cell transmits the PRS according to the configuration in the first PRS resource set. The second PRS resource set corresponds to one neighbor cell and the neighbor cell transmits the PRS according to the configuration of the second PRS resource set. The UE can measure the PRS transmissions from both the serving cell and the neighbor cell according the configuration of the first PRS resource set and the second PRS resource set, which are received from the location server. The UE can be requested to report the RSTD measurement result to the location server. From the first PRS resource set, the UE picks one PRS resource with the best signal quality, for example, largest Reference Signal Receiving Power (RSRP), and use the picked PRS resource as the reference resource for RSTD measurement. From the second PRS resource set, the UE picks one PRS resource to measure the RSTD with respect to the reference resource. From the second resource set, the UE can pick one resource according to various conditions. One alternative is the UE pick the PRS resource with largest RSRP. Another alternative is the UE can pick the PRS resource that corresponds to the same Rx beam as the reference resource. Finally, the UE can report the RSTD measurement result to the location server, which can include ID of the PRS resource selected as the reference PRS resource for RSTD measurement, ID of the PRS resource in the second resource set used for RSTD measurement and the RSTD value.

Third Example

For the first PRS resource, the UE can be configured with the following parameters.

Periodicity and Slot Offset for PRS Transmission

Herein, the periodicity is represented by $PRS_{PERIODICITY}$, and the slot offset is represented by $PRS_{OFFSET}$. The UE determines a transmission in the first PRS resource to be in a slot with slot number $n_{s,f}^{\mu}$ in a frame with frame number $n_f$ if the slot number and the frame number satisfy:

$$(n_f \times N_{slot}^{frame,\mu} + n_{s,f}^{\mu} - PRS_{OFFSET})$$
$$\text{Mod } PRS_{PERIODICITY} = 0,$$

where $\mu$ is the numerology used by the PRS transmission, $N_{slot}^{frame,\mu}$ is the number of slots contained in one frame for the numerology $\mu$.

Frequency-Domain Allocation

Herein, the frequency-domain allocation is determined by an index of a starting Physical Resource Block (PRB) and a number of PRBs allocated to the first PRS resource, where the index of the starting PRB is represented by $k_{starting}$ and the number of PRBs is represented by $N_{PRB}$.

Time Domain Allocation Within One Slot

Herein, the time domain allocation is determined by an index of a starting OFDM symbol and the number of OFDM symbols allocated to the first PRS resource, where the index of the starting OFDM symbol is represented by $m_{starting}$ and the number of OFDM symbols is represented by $N_{sym}$.

PRS Repetition Factor $PRS_{REPETITION}$ $PRS_{REPETITION}$ is used to configure a number of slots for repetitions of the first PRS resource within each periodicity. The value of $PRS_{REPETITION}$ can be 1 or greater than 1. If $PRS_{REPETITION} > 1$, the UE determines that the first PRS resource is repeated over $PRS_{REPETITION}$ slots starting from a slot with slot number $n_{s,f}^{\mu}$ in a frame with frame number $n_f$ if the slot number and the frame number satisfy:

$$(n_f \times N_{slot}^{frame,\mu} + n_{s,f}^{\mu} - PRS_{OFFSET}) \text{ Mod } PRS_{PERIODICITY} = 0.$$

It should be noted that, the transmission on the first PRS resource in each of the $PRS_{REPETITION} > 1$ slots has the same time-domain and frequency domain allocation, same transmit power, and same spatial domain transmit filter.

Muting Information

It should be noted that the configuration for the first PRS resource in the above solution may be also applicable to other PRS resources. The muting information configured for each PRS resource is described below in detail.

Fourth Example

In an embodiment, PRS muting configuration is configured per PRS resource. For two different PRS resources in one same PRS resource set, different PRS muting configurations can be configured. A motivation for configuring PRS muting configuration per PRS resource is that the NR system are generally multi-beam-based system and different PRS resources are transmitted with different transmission beams. Therefore, different interference would be experienced by different PRS resources. For a first PRS resource, the UE can be configured with one or more of the following parameters for PRS muting configuration.

First Parameter

The first parameter is used to determine a periodic muting sequence.

The periodic muting sequence $B_{muting}$ is used to indicate in which PRS period the PRS transmission shall be muted. $B_{muting}$ can be a bit string of length $$N_{B_{muting}} : \{b_0 b_1 b_2 \ldots b_{N_{B_{muting}}-1}\}.$$

Example of $N_{B_{muting}}$ can be 2, 4, 8, 16, or 32. Each bit in $B_{muting}$ represents whether the PRS transmission of the first PRS resource in the corresponding period shall be muted or not. However, which repetition(s) of the PRS transmission of the first PRS resource in one period shall be muted would be determined by the following parameter.

Second Parameter

The second parameter is used to determine muting configuration on PRS repetitions within one PRS period.

The muting configuration on PRS repetitions within one PRS period, $A_{muting}$, is used to indicate the slot(s), among those $PRS_{REPETITION}$ slots, in which the PRS transmission of the first PRS resource shall be muted. $A_{muting}$ can be a bit string of length $PRS_{REPETITION}$: $\{\alpha_1 \alpha_2 \ldots \alpha_{PRS_{REPETITION}}\}$. Each bit in $A_{musing}$ corresponds to one slot in those $PRS_{REPETITION}$ slots.

Third Parameter

The third parameter is used to determine frequency-domain muting configuration.

The frequency-domain muting configuration, $F_{muting}$, is used to indicate one part of the frequency domain allocation of the first PRS resource in which the PRS transmission is muted.

One example for $F_{muting}$ is that $F_{muting}$ provides a one-bit value, $k_{muting}$, that is used to indicate a starting PRB or an ending PRB in the frequency domain allocation for the first PRS resource and a number of PRBs, $n_{RB,muting}$. If $k_{muting}$ indicates the starting PRB, then the PRS transmission of the first PRS resource over $n_{RB,muting}$ RBs starting from the starting PRB, $k_{starting}$ in the frequency domain allocation for the first PRS resource shall be muted. If $k_{muting}$ indicates the ending PRB, then the PRS transmission of the first PRS resource over RBs $\{k_{starting} + N_{PRB} - n_{RB,muting}, \ldots, k_{starting} + N_{PRB} - 2, k_{starting} + N_{PRB} - 1\}$ in the frequency domain allocation for the first PRS resource shall be muted.

One example is that the $N_{PRB}$ RBs in the frequency domain allocated to the first PRS resource are partitioned into $N_{PRB\_RBG}$ RB groups and each RB group can contain one or more consecutive RBs. The $F_{muting}$ is a bit string of length $N_{PRS\_RBG}$. Each bit in $F_{muting}$ corresponds to one RB group. For example, if a bit in $F_{muting}$ is set to "0", then the PRS transmission on the corresponding RB group shall be muted.

Fourth Parameter

The fourth parameter is used to determine a symbol-level muting configuration.

The symbol-level muting configuration, $D_{muting}$, is used to indicate one part of the $N_{sym}$ symbols over which the PRS transmission of the first PRS resource shall be muted.

One example for $D_{muting}$ is that $D_{muting}$ provides a one-bit value, $k_{sym,muting}$, that is used to indicate a starting OFDM symbol or an ending OFDM symbol among those $N_{sym}$ symbols allocated for the first PRS resource and a number of symbols, $n_{sym,muting}$. If $k_{sym,muting}$ indicates the starting symbol, then the PRS transmission of the first PRS resource over $n_{sym,muting}$ symbols starting from the starting OFDM symbol, $m_{starting}$ shall be muted. If $k_{sym,muting}$ indicates the ending symbol, then the PRS transmission of the first PRS resource over symbols $\{m_{starting} + N_{sym} - n_{sym,muting}, \ldots, m_{starting} + N_{sym} - 2, m_{starting} + N_{sym} - 1\}$ allocated for the first PRS resource shall be muted.

One example for $D_{muting}$ is that $D_{muting}$ is a bit string of length $N_{sym}$. Each bit in $D_{muting}$ corresponds to one symbol among those $N_{sym}$ symbols allocated to the first PRS resource. For example, if a bit in $D_{muting}$ is set to "0", then the PRS transmission on the corresponding symbol shall be muted.

For the first PRS resource, the UE can be configured with one or more of the above four muting parameters. The UE shall determine a muting pattern of PRS transmission in the first PRS resource according to a combination of configured muting parameters.

The way for configuring the muting information will be further described below in conjunction with specific examples.

In an example, if the UE is configured with the periodic muting sequence $B_{muting}$, the UE shall determine the PRS period for muting. If the bit $b_l$ (l=1, 2 ..., $N_{B_{muting}}$) in $B_{muting}$ is set to "0", then the UE shall determine the PRS transmission of the first PRS resource is muted in all $PRS_{REPETITION}$ slots starting from a slot with slot number $n_{s,f}^{\mu}$ in a frame with frame number $n_f$ if the slot number and the frame number satisfy:

$$(n_f \times N_{slot}^{frame,\mu} + n_{s,f}^{\mu} - PRS_{OFFSET}) \text{ Mod } PRS_{PERIODICITY} = 0 \text{ and}$$

$$\frac{(n_f \times N_{slot}^{frame,\mu} + n_{s,f}^{\mu} - PRS_{OFFSET})}{PRS_{PERIODICITY}} \text{ Mod } N_{B_{muting}} = l.$$

In an example, if the UE is configured with the periodic muting sequence $B_{muting}$ and the muting configuration on PRS repetitions within one PRS period, $A_{muting}$, the UE shall use $B_{muting}$ to determine which PRS period has PRS muting and use $A_{muting}$ to determine the slots within the PRS period with PRS muting, in which the PRS transmission is muted. If the bit $b_l$ (l=1, 2 . . . , $N_{B_{muting}}$) in $B_{muting}$ is set to "0", the UE shall determine the PRS transmission of the first PRS resource is muted in the slot(s) indicated by $A_{musing}$ among $PRS_{REPETITION}$ slots starting from a slot with slot number $n_{s,f}^\mu$ in a frame with frame number $n_f$ if the slot number and the frame number satisfy:

$$(n_f \times N_{slot}^{frame,\mu} + n_{s,f}^\mu - PRS_{OFFSET}) \text{Mod } PRS_{PERIODICITY} = 0 \text{ and}$$

$$\frac{(n_f \times N_{slot}^{frame,\mu} + n_{s,f}^\mu - PRS_{OFFSET})}{PRS_{PERIODICITY}} \text{Mod } N_{B_{muting}} = l.$$

In an example, if the UE is configured with the periodic muting sequence $B_{muting}$, and the frequency-domain muting configuration, $F_{muting}$, the UE shall use $B_{muting}$ to determine which PRS period has PRS muting and use $F_{muting}$ to determine the RBs in which the PRS transmission is muted. If the bit $b_l$ (l=1, 2 . . . , $N_{B_{muting}}$) in $B_{muting}$ is set to "0", the UE shall determine the PRS transmission of the first PRS resource is muted in the RBs indicated by $F_{muting}$ in all $PRS_{REPETITION}$ slots starting from a slot with slot number $n_{s,f}^\mu$ in a frame with frame number $n_f$ if the slot number and the frame number satisfy:

$$(n_f \times N_{slot}^{frame,\mu} + n_{s,f}^\mu - PRS_{OFFSET}) \text{Mod } PRS_{PERIODCITY} = 0 \text{ and}$$

$$\frac{(n_f \times N_{slot}^{frame,\mu} + n_{s,f}^\mu - PRS_{OFFSET})}{PRS_{PERIODICITY}} \text{Mod } N_{B_{muting}} = l.$$

In an example, if the UE is configured with the periodic muting sequence $B_{muting}$, the muting configuration on PRS repetitions within one PRS period, $A_{muting}$, the symbol-level muting configuration, $D_{muting}$ and the frequency-domain muting configuration $F_{muting}$, the UE shall use $B_{muting}$ to determine which PRS period has PRS muting, use $A_{muting}$ to determine the slots for muting within the PRS period with PRS muting and use $D_{muting}$ to determine the symbols in which the PRS transmission is muted within a slot which is configured with PRS muting for the slot. The UE shall also use $F_{muting}$ to determine the RBs in which the PRS transmission of the first PRS resource is muted. If the bit $b_l$ (l=1, 2 . . . , $N_{B_{muting}}$) in $B_{muting}$ is set to "0", the UE shall determine the PRS transmission of the first PRS resource is muted in the RBs determined by $F_{muting}$ in the symbols indicated by $D_{muting}$ in any slot indicated by $A_{muting}$ among all $PRS_{REPETITION}$ slots starting from a slot with slot number $n_{s,f}^\mu$ in a frame with frame number $n_f$ if the slot number and the frame number satisfy:

$$(n_f \times N_{slot}^{frame,\mu} + n_{s,f}^\mu - PRS_{OFFSET}) \text{Mod } PRS_{PERIODCITY} = 0 \text{ and}$$

$$\frac{(n_f \times N_{slot}^{frame,\mu} + n_{s,f}^\mu - PRS_{OFFSET})}{PRS_{PERIODICITY}} \text{Mod } N_{B_{muting}} = l.$$

In an example, if the UE is configured with the periodic muting sequence $B_{muting}$, the muting configuration on PRS repetitions within one PRS period, $A_{muting}$, and the symbol-level muting configuration, $D_{muting}$, the UE shall use $B_{muting}$ to determine which PRS period has PRS muting, use $A_{muting}$ to determine the slots for muting within the PRS period with PRS muting and use $D_{muting}$ to determine the symbols in which the PRS transmission is muted within a slot which is configured with PRS muting for the slot. If the bit $b_l$ (l=1, 2 . . . , $N_{B_{muting}}$) in $B_{muting}$ is set to "0", the UE shall determine the PRS transmission of the first PRS resource is muted on the symbols indicated by $D_{muting}$ in any slot indicated by $A_{muting}$ among all $PRS_{REPETITION}$ slots starting from a slot with slot number $n_{s,f}^\mu$ in a frame with frame number $n_f$ if the slot number and the frame number satisfy:

$$(n_f \times N_{slot}^{frame,\mu} + n_{s,f}^\mu - PRS_{OFFSET}) \text{Mod } PRS_{PERIODCITY} = 0 \text{ and}$$

$$\frac{(n_f \times N_{slot}^{frame,\mu} + n_{s,f}^\mu - PRS_{OFFSET})}{PRS_{PERIODICITY}} \text{Mod } N_{B_{muting}} = l.$$

In another aspect, the NR system supports a flexible numerology, in contrast with the LTE system where single subcarrier spacing 15 KHz is supported. The PRSs transmitted from different cells might use different subcarrier spacing and thus different length of slot. For better alignment of PRS muting between cells using different slot lengths, the muting configuration shall be numerology-dependent. In an example, the muting configuration for one PRS resource is defined based on the numerology used by that PRS. For example, the periodic muting sequence $B_{muting}$ configuration depends on the subcarrier spacing used by the PRS resource. For subcarrier spacing 15 KHz, the length of $B_{muting}$ can be 2/4/8/16. For subcarrier spacing 30 KHz, the length of $B_{muting}$ can be 4/8/16/32. For subcarrier spacing 60 KHz, the length of $B_{muting}$ can be 8/16/32/64. For subcarrier spacing 120 KHz, the length of $B_{muting}$ can be 16/32/64/128.

In another aspect, the muting configuration for a first PRS resource is defined based on a Comb size configured to the first PRS resource. In one example, the Comb size configured to the first PRS resource can be 2, 4, 6, or 12. Then the first PRS resource shall be configured with one Comb sizes for RE mapping in the frequency domain. The muting configuration for the first PRS resource is defined based on the Comb size configured to the first PRS resource. For example, for Comb size 2, the length of $B_{muting}$ can be 4/8/16; for Comb size 4, the length of $B_{muting}$ can be 4/8/16; for Comb size 6, the length of $B_{muting}$ can be 3/6/12 and for Comb size 12, the length of $B_{muting}$ can be 2/4/8.

The proposed methods of configuration and transmission of DL PRS support the multi-beam and beam sweeping operation in NR systems. The muting mechanism proposed in this invention can flexibly mute partial transmission chances in time-domain and/or frequency domain by taking into account the beam sweeping operation and flexible allocation bandwidth, numerology and a number of symbols for PRS allocation in the NR system. Thus, the resource efficiency of PRS transmission is improved.

Figure 5:
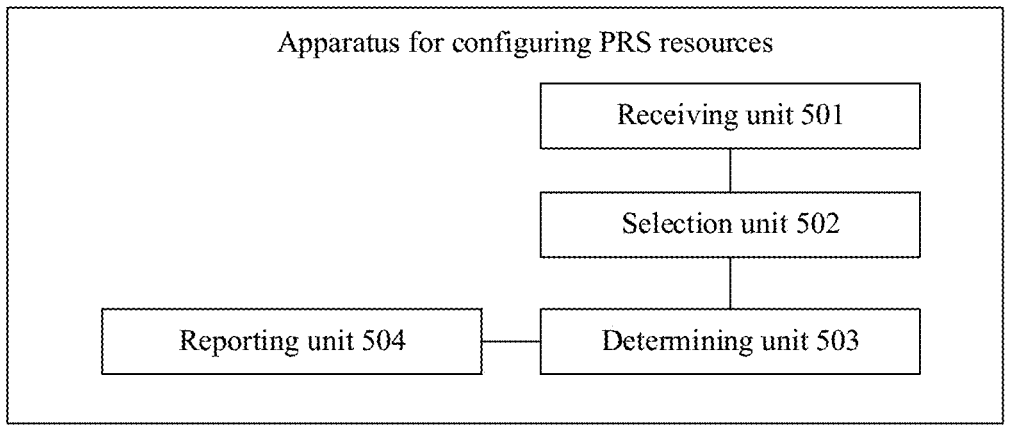
FIG. 5 is a block diagram of an apparatus for configuring PRS resources according to an embodiment of the disclosure.

FIG. 5 is a block diagram of an apparatus for configuring PRS resources according to an embodiment of the disclosure. The apparatus is applied to a UE. As shown in FIG. 5, the apparatus for configuring PRS resources includes a receiving unit 501.

The receiving unit 501 is configured to receive first configuration information from a network device. The first configuration information includes configuration information about multiple PRS resource sets. The multiple PRS resource sets include a first PRS resource set and at least one second PRS resource set. The first PRS resource set is configured as a reference set for RSTD measurement, and the second PRS resource set is configured for RSTD measurement.

In an implementation, the configuration information about the first PRS resource set includes at least one of: configuration information of a first reference point, where the first reference point is a reference point for the first PRS resource set in the frequency domain; configuration information of a first numerology; configuration information of a first SSB; or configuration information for each PRS resource in the first PRS resource set.

In an implementation, the configuration information about the second PRS resource set includes at least one of: configuration information of a second reference point, where the second reference point is a reference point for the second PRS resource set in the frequency domain; configuration information of a second numerology; configuration information of a second SSB; or configuration information for each PRS resource in the second PRS resource set.

In an implementation, the configuration information for each PRS resource includes at least one of: a frequency-domain allocation of the PRS resource, a time-domain allocation of the PRS resource within a slot, a transmission periodicity of the PRS resource, a slot offset of the PRS resource, a repetition factor of the PRS resource, a muting information for the PRS resource or a QCL resource information for the PRS resource.

In an implementation, the muting information includes at least one of: a first parameter, a second parameter, a third parameter, or a fourth parameter.

The first parameter is used to determine whether each transmission period in the time domain shall be muted.

The second parameter is used to determine whether each PRS repetition slot in a transmission period shall be muted.

The third parameter is used to determine that a first part of the frequency domain allocation shall be muted.

The fourth parameter is used to determine that a second part of the time domain allocation shall be muted.

In an implementation, the apparatus further includes a selection unit 502, a determination unit 503 and a reporting unit 504.

The selection unit 502 is configured to select a first PRS resource from the first PRS resource set as a reference resource for RSTD measurement, and select a second PRS resource from the second PRS resource set for RSTD measurement.

The determining unit 503 is configured to determine an RSTD value based on a PRS received in the first PRS resource and a PRS received in the second PRS resource.

The reporting unit 504 is configured to report an RSTD measurement result to the network device.

In an implementation, the first PRS resource is a PRS resource with a best signal quality in the first PRS resource set.

In an implementation, the second PRS resource is a PRS resource with a best signal quality in the second PRS resource set. Alternatively, the second PRS resource is a PRS resource, that is associated with the same beam as the first PRS resource, in the second PRS resource set.

In an implementation, the RSTD measurement result includes at least one of: an identifier of the first PRS resource, an identifier of the second PRS resource, and the RSTD value.

In an implementation, each PRS resource in the first PRS resource set is associated with a respective beam, and each PRS resource in the second PRS resource set is associated with a respective beam.

Those skilled in the art will appreciate that functions implemented by each unit in the apparatus for configuring PRS resources may be understood with reference to related descriptions about the method for configuring PRS resources.

Figure 6:
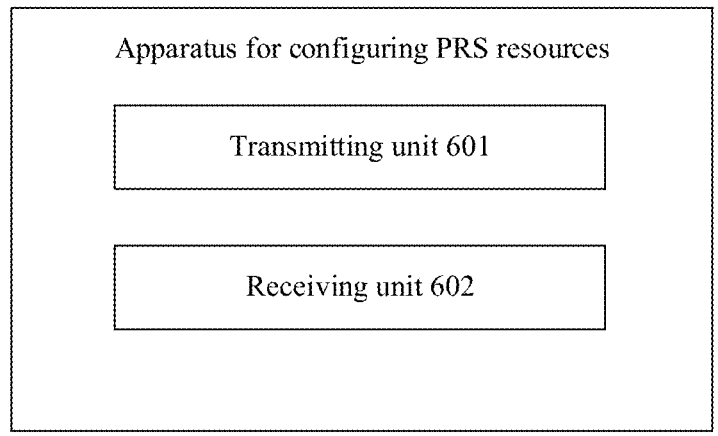
FIG. 6 is a block diagram of an apparatus for configuring PRS resources according to an embodiment of the disclosure.

FIG. 6 is a block diagram of an apparatus for configuring PRS resources according to an embodiment of the disclosure. The apparatus is applied to a network device. As shown in FIG. 6, the apparatus for configuring PRS resources includes a transmitting unit 601.

The transmitting unit 601 is configured to transmit first configuration information to a UE. The first configuration information includes configuration information about multiple PRS resource sets. The multiple PRS resource sets include a first PRS resource set and at least one second PRS resource set. The first PRS resource set is configured as a reference set for RSTD measurement, and the second PRS resource set is configured for RSTD measurement.

In an implementation, the configuration information about the first PRS resource set includes at least one of: configuration information of a first reference point, where the first reference point is a reference point for the first PRS resource set in the frequency domain; configuration information of a first numerology; configuration information of a first SSB; or configuration information for each PRS resource in the first PRS resource set.

In an implementation, the configuration information about the second PRS resource set includes at least one of: configuration information of a second reference point, where the second reference point is a reference point for the second PRS resource set in the frequency domain; configuration information of a second numerology; configuration information of a second SSB; or configuration information for each PRS resource in the second PRS resource set.

In an implementation, the configuration information for each PRS resource includes at least one of: a frequency-domain allocation of the PRS resource, a time-domain allocation of the PRS resource within a slot, a transmission periodicity of the PRS resource, a slot offset of the PRS resource, a repetition factor of the PRS resource, a muting information for the PRS resource or a QCL resource information for the PRS resource.

In an implementation, the muting information includes at least one of: a first parameter, a second parameter, a third parameter, or a fourth parameter.

The first parameter is used to determine whether each transmission period in the time domain shall be muted.

The second parameter is used to determine whether each PRS repetition slot in a transmission period shall be muted.

The third parameter is used to determine that a first part of the frequency domain allocation shall be muted.

The fourth parameter is used to determine that a second part of the time domain allocation shall be muted.

In an implementation, the apparatus further includes a receiving unit 602.

The receiving unit 602 is configured to receive an RSTD measurement result reported by the UE. The RSTD measurement result includes at least one of: an identifier of a first PRS resource, an identifier of a second PRS resource, and an RSTD value.

The first PRS resource belongs to the first PRS resource set and is used as a reference resource for RSTD measurement.

The second PRS resource belongs to the second PRS resource set and is used for RSTD measurement.

The RSTD value is determined by the UE based on a PRS received in the first PRS resource and a PRS received in the second PRS resource.

In an implementation, each PRS resource in the first PRS resource set is associated with a respective beam, and each PRS resource in the second PRS resource set is associated with a respective beam.

Those skilled in the art will appreciate that functions implemented by each unit in the apparatus for configuring PRS resources may be understood with reference to related descriptions about the method for configuring PRS resources.

Figure 7:
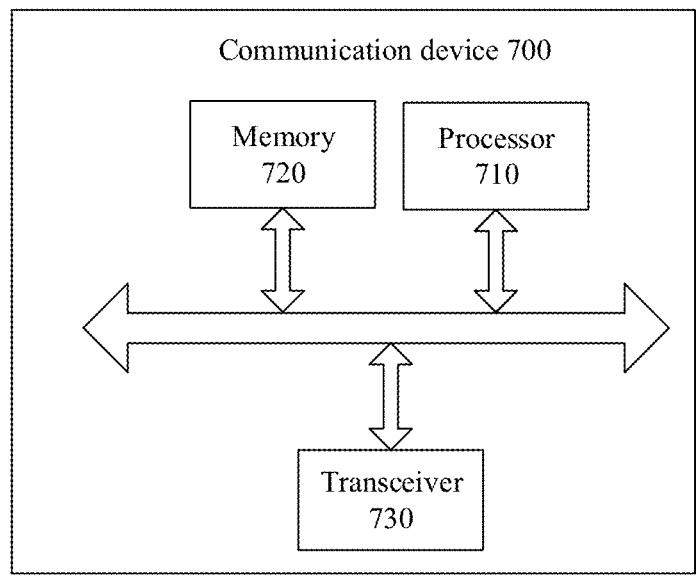
FIG. 7 is a structural diagram of a communication device according to an embodiment of the disclosure.

FIG. 7 is a structural diagram of a communication device 700 according to the embodiments of the present disclosure. The communication device may be a UE, or may be a network device. The communication device 700 as illustrated in FIG. 7 includes a processor 710 configured to call and execute computer programs in a memory to perform the methods in the embodiments of the present disclosure.

In the embodiments of the present disclosure, the communication device 700 further includes a memory 720. The processor 710 may be configured to call and execute the computer programs stored in the memory 720 to perform the methods in the embodiments of the present disclosure.

Here, the memory 720 may be a separate device independent of the processor 710, or may be integrated into the processor 710.

Optionally, as illustrated in FIG. 7, the communication device 700 further includes a transceiver 730. The processor 710 may control the transceiver 730 to perform communication with another device, so as to transmit information or data to the another device or receive information or data from the another device.

Here, the transceiver 730 may include a transmitter and a receiver. The transceiver 730 may further include antennas, and the number of antennas may be one or more.

Optionally, the communication device 700 may be a network device in the embodiments of the present disclosure. Moreover, the communication device 700 may be configured to implement the corresponding processes implemented by the network device in various methods in the embodiments of the present disclosure. For simplicity, details are not described herein again.

Optionally, the communication device 700 may be a mobile terminal/UE in the embodiments of the present disclosure. Moreover, the communication device 700 may be configured to implement the corresponding processes implemented by the mobile terminal/UE in various methods in the embodiments of the present disclosure. For simplicity, details are not described herein again.

Figure 8:
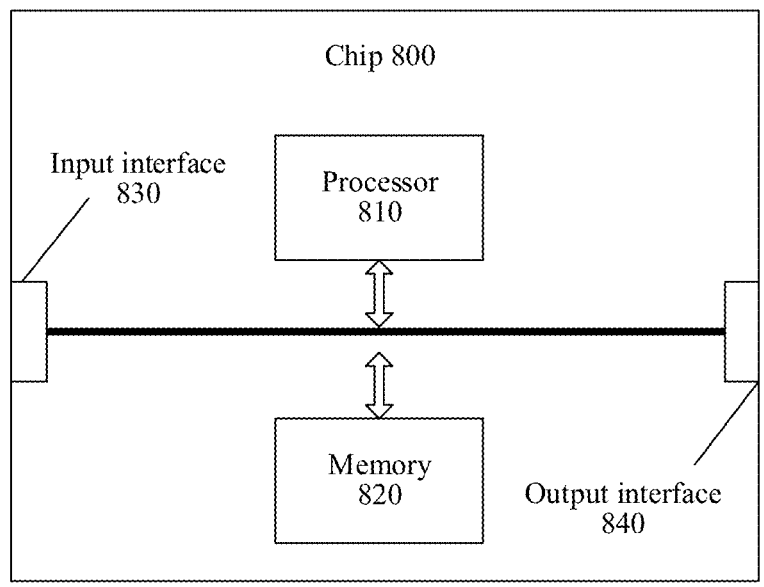
FIG. 8 is a structural diagram of a chip according to an embodiment of the disclosure.

FIG. 8 is a structural diagram of a chip according to an embodiment of the present disclosure. As illustrated in FIG. 8, the chip 800 includes a processor 810 configured to call and execute computer programs in a memory to perform the methods in the embodiments of the present disclosure.

Optionally, as illustrated in FIG. 8, the chip 800 further includes a memory 820. The processor 810 may be configured to call and execute the computer programs stored in the memory 820 to perform the methods in the embodiments of the present disclosure.

Here, the memory 820 may be a separate device independent of the processor 810, or may be integrated into the processor 810.

Optionally, the chip 800 may further include an input interface 830. The processor 810 may control the input interface 830 to communicate with another device or chip, so as to obtain information or data from the another device or chip.

Optionally, the chip 800 may further include an output interface 840. The processor 810 may control the output interface 840 to communicate with another device or chip, so as to output information or data to the another device or chip.

Optionally, the chip may be applied to the network device in the embodiments of the present disclosure, and the chip may implement the corresponding processes implemented by the network device in various methods in the embodiments of the present disclosure. For simplicity, details are not described herein again.

Optionally, the chip may be applied to the mobile terminal/UE in the embodiments of the present disclosure, and the chip may implement the corresponding processes implemented by the mobile terminal/UE in various methods in the embodiments of the present disclosure. For simplicity, details are not described herein again.

It should be understood that the chip in the embodiments of the present disclosure may also be called as a system-level chip, a system chip, a chip system or a system-on-chip.

Figure 9:
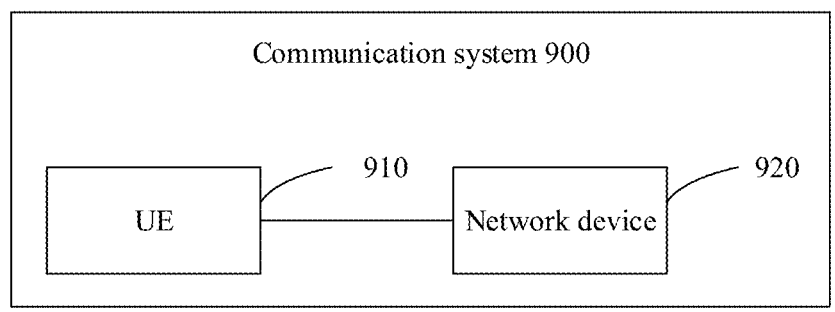
FIG. 9 is a block diagram of a communication system according to an embodiment of the disclosure.

FIG. 9 is a block diagram of a communication system 900 according to an embodiment of the present disclosure. As illustrated in FIG. 9, the communication system 900 includes a UE 910 and a network device 920.

Here, the UE 910 may be configured to perform the corresponding functions implemented by the UE in the above methods. The network device 920 may be configured to perform the corresponding functions implemented by the network device in the above methods. For simplicity, details are not described herein again.

It should be understood that the processor in the embodiments of the disclosure may be an integrated circuit chip and has a signal processing capability. In the implementation process, each operation in the foregoing method embodiments may be completed by an integrated logic circuit in a form of hardware in a processor or instructions in a form of software in a processor. The above processor may be a general-purpose processor, a Digital Signal Processor (DSP), an Application Specific Integrated Circuit (ASIC), a Field Programmable Gate Array (FPGA) or another Programming logic devices, a discrete gate or transistor logic device, a discrete hardware component, or the like. Various methods, operations, and logical blocks disclosed in the embodiments of the present disclosure can be implemented or executed. A general-purpose processor may be a microprocessor or the processor may be any conventional processor or the like. The operations in the methods disclosed in combination with the embodiments of the present disclosure may be directly implemented by a decoding processor in hardware form, or may be implemented by a combination of hardware and software modules in the decoding processor. The software modules may be located in a mature storage medium in the art, such as a Random Access Memory (RAM), a flash memory, a Read-Only Memory (ROM), a Programmable Read-Only Memory (PROM), an Erasable Programmable Read-Only Memory (EPROM), an Electrically Erasable Programmable Read-Only Memory (EEPROM), a register, and the like. The storage medium is located in a memory, and the processor reads the information in the memory and completes the operations in the foregoing methods in combination with the hardware of the processor.

It should be understood that the memory in the embodiments of the present disclosure may be a volatile memory or a non-volatile memory, or may include the volatile memory and the non-volatile memory. The non-volatile memory may be a ROM, a PROM, an EPROM, EEPROM or a flash memory, or the like. The volatile memory may be a RAM, which is used as an external cache. By way of example, but not limitation, many forms of RAMs are available, such as a Static Random Access Memory (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described herein is intended to include, but is not limited to, these and any other suitable types of memory.

The embodiments of the present disclosure further provide a computer-readable storage medium for storing computer programs.

Optionally, the computer-readable storage medium may be applied to the network device in the embodiments of the present disclosure, and the computer programs cause a computer to execute the corresponding processes implemented by the network device in each method in the embodiments of the present disclosure. For simplicity, details are not described herein again.

Optionally, the computer-readable storage medium may be applied to the mobile terminal/UE in the embodiments of the present disclosure, and the computer programs cause a computer to execute the corresponding processes implemented by the mobile terminal/UE in each method in the embodiments of the present disclosure. For simplicity, details are not described herein again.

The embodiments of the present disclosure further provide a computer program product including computer program instructions.

Optionally, the computer program product may be applied to the network device in the embodiments of the present disclosure, and the computer program instructions cause a computer to execute the corresponding processes implemented by the network device in each method in the embodiments of the present disclosure. For simplicity, details are not described herein again.

Optionally, the computer program product may be applied to the mobile terminal/UE in the embodiments of the present disclosure, and the computer program instructions cause a computer to execute the corresponding processes implemented by the mobile terminal/UE in each method in the embodiments of the present disclosure. For simplicity, details are not described herein again.

The embodiments of the present disclosure further provide a computer program.

Optionally, the computer program may be applied to the network device in the embodiments of the present disclosure. When the computer program is run on a computer, the computer is caused to execute the corresponding processes implemented by the network device in each method in the embodiments of the present disclosure. For simplicity, details are not described herein again.

Optionally, the computer program may be applied to the mobile terminal/UE in the embodiments of the present disclosure. When the computer program is run on a computer, the computer is caused to execute the corresponding processes implemented by the mobile terminal/UE in each method in the embodiments of the present disclosure. For simplicity, details are not described herein again.

A person of ordinary skill in the art may be aware that, units and algorithm operations in each example described in combination with the embodiments of in present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that for the purpose of convenient and brief description, detailed working processes of the foregoing system, device, and unit may refer to corresponding processes in the foregoing method embodiments, and details are not described herein again.

In the several embodiments provided in the present disclosure, it should be understood that the disclosed system, device, and method may be implemented in other manners. For example, the described device embodiments are merely examples. For example, the unit division is merely logical function division. During actual implementation, there may be another division manner. For example, a plurality of units or components may be combined or integrated into another system, or some features may be ignored or not performed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions in the embodiments.

In addition, each functional unit in each embodiment of the disclosure may be integrated into a processing unit, each unit may also serve as an independent unit and two or more than two units may also be integrated into a unit.

When being implemented in form of software functional module and sold or used as an independent product, the functions in the embodiments of the disclosure may be stored in a computer-readable storage medium. Based on such an understanding, the technical solutions in the embodiments of the disclosure substantially or parts making contributions to the conventional art may be embodied in form of software product, and the computer software product is stored in a storage medium, including a plurality of instructions used to enable a computer device (which may be a personal computer, a server, a network device or the like) to execute all or part of the operations in the method in each embodiment of the disclosure. The storage medium includes: various media capable of storing program codes such as a U disk, a mobile hard disk, a Read Only Memory (ROM), a RAM, a magnetic disk or an optical disk.

Described above are merely specific embodiments of the disclosure, and are not intended to limit the scope of protection of the disclosure. Any variations or replacements apparent to those skilled in the art within the technical scope disclosed by the disclosure shall fall within the scope of protection of the disclosure. Therefore, the scope of protection of the present disclosure shall be subject to the scope of protection of the claims.

The invention claimed is:

1. A method for configuring Positioning Reference Signal (PRS) resources, comprising:

receiving, by User Equipment (UE), configuration information for a PRS resource set from a network device, wherein the configuration information comprises a respective PRS muting configuration for each PRS resource in the PRS resource set, and different PRS muting configurations are configured for different PRS resources in the PRS resource set, wherein the PRS muting configuration for each PRS resource in the PRS resource set comprises:

a second parameter configured to determine muting configuration on PRS repetitions within one PRS period; and wherein the muting configuration on PRS repetitions within one PRS period is used to indicate a slot, among a number of slots for repetitions of the PRS resource within one PRS period, in which the PRS transmission of the PRS resource shall be muted; and wherein the muting configuration on PRS repetitions within one PRS period is a bit string with a length equaling to the number of slots for repetitions of the PRS resource within one PRS period, and each bit in the bit string corresponds to one slot in the slots for repetitions of the PRS resource within one PRS period.

2. The method of claim 1, wherein the PRS muting configuration for each PRS resource in the PRS resource set further comprises:

a first parameter configured to determine a periodic muting sequence.

3. The method of claim 2, wherein the periodic muting sequence is used to indicate in which PRS period a PRS transmission of the PRS resource shall be muted, and the periodic muting sequence is a bit string of length N, N being a positive integer.

4. The method of claim 3, wherein each bit in the periodic muting sequence represents whether the PRS transmission of the PRS resource in the corresponding PRS period shall be muted or not.

5. The method of claim 1, wherein each PRS resource in the PRS resource set is associated with a respective beam.

6. A method for configuring Positioning Reference Signal (PRS) resources, comprising:

transmitting, by a network device, configuration information for a PRS resource set to User Equipment (UE), wherein the configuration information comprises a respective PRS muting configuration for each PRS resource in the PRS resource set, and different PRS muting configurations are configured for different PRS resources in the PRS resource set, wherein the PRS muting configuration for each PRS resource in the PRS resource set comprises:

a second parameter configured to determine muting configuration on PRS repetitions within one PRS period; and wherein the muting configuration on PRS repetitions within one PRS period is used to indicate a slot, among a number of slots for repetitions of the PRS resource within one PRS period, in which the PRS transmission of the PRS resource shall be muted; and wherein the muting configuration on PRS repetitions within one PRS period is a bit string with a length equaling to the number of slots for repetitions of the PRS resource within one PRS period, and each bit in the bit string corresponds to one slot in the slots for repetitions of the PRS resource within one PRS period.

7. The method of claim 6, wherein the PRS muting configuration for each PRS resource in the PRS resource set further comprises:

a first parameter configured to determine a periodic muting sequence.

8. The method of claim 7, wherein the periodic muting sequence is used to indicate in which PRS period a PRS transmission of the PRS resource shall be muted, and the periodic muting sequence is a bit string of length N, N being a positive integer.

9. The method of claim 8, wherein each bit in the periodic muting sequence represents whether the PRS transmission of the PRS resource in the corresponding PRS period shall be muted or not.

10. The method of claim 6, wherein each PRS resource in the PRS resource set is associated with a respective beam.

11. An apparatus for configuring Positioning Reference Signal (PRS) resources, comprising:

a transceiver;

a processor; and a memory for storing a computer program, wherein the processor is configured to execute the computer program stored in the memory to:

control the transceiver to receive configuration information for a PRS resource set from a network device, wherein the configuration information comprises a respective PRS muting configuration for each PRS resource in the PRS resource set, and different PRS muting configurations are configured for different PRS resources in the PRS resource set, wherein the PRS muting configuration for each PRS resource in the PRS resource set comprises:

a second parameter configured to determine muting configuration on PRS repetitions within one PRS period; and wherein the muting configuration on PRS repetitions within one PRS period is used to indicate a slot, among a number of slots for repetitions of the PRS resource within one PRS period, in which the PRS transmission of the PRS resource shall be muted; and wherein the muting configuration on PRS repetitions within one PRS period is a bit string with a length equaling to the number of slots for repetitions of the PRS resource within one PRS period, and each bit in the bit string corresponds to one slot in the slots for repetitions of the PRS resource within one PRS period.

12. The apparatus of claim 11, wherein the PRS muting configuration for each PRS resource in the PRS resource set further comprises:

a first parameter configured to determine a periodic muting sequence.

13. The apparatus of claim 12, wherein the periodic muting sequence is used to indicate in which PRS period a PRS transmission of the PRS resource shall be muted, and the periodic muting sequence is a bit string of length N, N being a positive integer.

14. The apparatus of claim 13, wherein each bit in the periodic muting sequence represents whether the PRS transmission of the PRS resource in the corresponding PRS period shall be muted or not.

* * * * *